(12) United States Patent
Harada

(10) Patent No.: US 7,141,945 B2
(45) Date of Patent: Nov. 28, 2006

(54) METHOD AND APPARATUS FOR CONTROLLING MOTOR DRIVE

(75) Inventor: Koji Harada, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/283,691

(22) Filed: Nov. 22, 2005

(65) Prior Publication Data

US 2006/0110140 A1     May 25, 2006

(30) Foreign Application Priority Data

Nov. 24, 2004   (JP)   ............................. 2004-338476

(51) Int. Cl.
*H02P 7/06*     (2006.01)
*H02P 7/29*     (2006.01)

(52) U.S. Cl. .................. 318/254; 318/439; 318/138; 318/721; 318/599; 318/811; 388/804; 388/814

(58) Field of Classification Search ................ None
See application file for complete search history.

(56) References Cited

U.S. PATENT DOCUMENTS

| | | | | |
|---|---|---|---|---|
| 3,678,356 A | * | 7/1972 | Van Ostrand | ............... 388/829 |
| 3,753,067 A | * | 8/1973 | Milligan | ...................... 388/811 |
| 4,549,120 A | * | 10/1985 | Banno et al. | ................ 318/254 |
| 4,885,793 A | * | 12/1989 | Tabuchi | ....................... 388/811 |
| 4,890,047 A | * | 12/1989 | Maney | ........................ 318/661 |
| 5,590,237 A | * | 12/1996 | Audemard | ................... 388/832 |
| 5,621,288 A | * | 4/1997 | Seki et al. | ................... 318/431 |
| 6,459,225 B1 | * | 10/2002 | Maruyama | ................... 318/560 |
| 2003/0184248 A1 | * | 10/2003 | Muroi et al. | ................ 318/466 |
| 2005/0281545 A1 | * | 12/2005 | Sugimoto et al. | ........... 388/805 |

FOREIGN PATENT DOCUMENTS

JP     11-150978     6/1999

* cited by examiner

*Primary Examiner*—Lincoln Donovan
*Assistant Examiner*—Eduardo Colon Santana
(74) *Attorney, Agent, or Firm*—Westerman, Hattori, Daniels & Adrians, LLP

(57) ABSTRACT

In the invention, a PWM signal is formed at a frequency of a reference pulse signal, the PWM signal which has a pulse width being changed according to a frequency difference between an FG pulse signal for detecting a speed of a brushless motor and the reference pulse signal of a target speed, an output signal for PWM control is formed by an N-fold frequency of the PWM signal, the output signal for PWM control in which a pulse having the divided pulse width is arranged in each N-divided period, the N-divided period in which each one period of the PWM signal is divided by N, and electric power supply to a coil of each phase of the brushless motor is turned on and off at intervals shorter than that of the output signal control without increasing the frequency of the reference pulse signal. Therefore, speed control performance of the brushless motor is improved while avoiding the upsizing and const increase of the apparatus

4 Claims, 9 Drawing Sheets

METHOD AND APPARATUS FOR CONTROLLING MOTOR DRIVE

BACKGROUND OF THE INVENTION

1. Field of the Invention

The present invention relates to a method and apparatus for controlling motor drive in which a brushless motor is driven by PWM speed control.

2. Description of the Related Art

Conventionally this kind of brushless motor (also referred to as brushless DC motor or brushless AC motor) typified by a three-phase brushless motor is used for driving various kinds of office automation equipment such as a sheet-feed motor of a printer. In order to accurately drive the brushless motor at a setting speed, the PWM speed control is frequently used as speed control of the brushless motor.

When the PWM speed control is performed by detecting a frequency according to a rotating speed of the brushless motor, an FG sensor is used as means for detecting the rotating speed of a rotor of the brushless motor. A PWM signal is formed at the frequency of a reference pulse signal such that the frequency (phase) of a frequency pulse signal (FG pulse signal) indicating a detection speed obtained by the FG sensor coincides with the frequency (phase) of the reference pulse signal (clock signal) indicating a previously set target speed. In the PWM signal, a pulse width is changed according to a frequency difference (phase difference) between the frequency pulse signal and the reference pulse signal. The PWM signal enables a switching operation of a switching device constituting an inverter circuit in a motor drive unit. Therefore, electric power supply to a motor coil is controlled by the so-called PWM control, and the rotating speed of the brushless motor is controlled at the target speed.

When the brushless motor drive is controlled by the PWM speed control method, a coil current of each phase of the brushless motor alternates between tuner-on and turn-off at periods of the PWM signal, i.e., at periods of the reference pulse signal. At this point, the coil current of each phase tends to be increased at an integral characteristic, and the coil current of each phase tends to be decreased at a differential characteristic.

Therefore, even if duty ratio of a pulse-width of the PWM signal is, e.g., 20%, because the coil currents of the phases are not accurately controlled at magnitude of 20%, there is a fear that the brushless motor is not rotated at desired speed and torque.

In order to solve the above problem, it is thought that the PWM signal is shifted to the higher frequency to perform the on-and-off control of the coil current of each phase at shorter intervals by increasing the frequency of the reference pulse signal. However, in this kind of brushless motor used as the drive source of the office automation equipment, the drive control is frequently realized by the motor drive control apparatus which is formed by a digital signal processor (DSP) or a dedicated motor control IC. In this case, upgrading of DSP or the motor control IC is required for such a vast change that the frequency (period) of the reference pulse signal is changed, which results in the problems that the apparatus becomes extremely expensive while a circuit scale of DSP or the motor control IC is enlarged to remarkably upsize the apparatus. Therefore, it is impractical.

When the rotating speed of the brushless motor is decreased, in order to perform design so as to become a predetermined speed in a rated load state, and in order to keep the predetermined speed in no-load running or in light-load running, it is necessary that the rotating speed of the brushless motor is controlled more finely. In order to perform the fine control, it is necessary to take a countermeasure such as the increase in frequency (period) of the reference pulse signal. However, as described above, the change in clock frequency or register configuration, update of a processing program, or the like is required for such the vast change that the frequency (period) of the reference pulse signal is changed, so that the upgrading of DSP or the motor control IC is required. As a result, there are the problems that the apparatus becomes extremely expensive while the circuit scale of DSP or the motor control IC is enlarged to remarkably upsize the apparatus.

Thus, it is very difficult to take the countermeasure such as the increase in frequency (period) of the reference pulse signal, and conventionally it is impossible to control the rotating speed of the brushless motor more finely. When the brushless motor drive control apparatus is not formed by DSP or the dedicated motor control IC, it is obvious that the above problems are also generated.

SUMMARY OF THE INVENTION

A PWM signal is generated according to a frequency of a reference pulse signal, the PWM signal which has a pulse width being changed according to a frequency difference between a frequency pulse signal and the reference pulse signal, the frequency pulse signal being obtained by detecting a rotating speed of the rotor, the reference pulse signal being a predetermined target speed; a divided pulse width in which each one-period pulse width of the PWM signal is divided by a setting value N is determined; an output signal for PWM control is generated by an N-fold frequency of the PWM signal, the output signal for PWM control in which a pulse having the divided pulse width is arranged in each N-divided period, the N-divided period in which each one period of the PWM signal is divided by N; and PWM control of electric power supply to a coil of the blushless motor is performed according to the output signal.

According to the invention, one-period PWM signal is divided into N-divided signals having the equal pulses of N periods to form the output signal having the N-fold frequency of the PWM signal. The PWM control of the electric power supply to the coil is performed by the output signal, which results in the control state equivalent to the case in which the frequency of the reference pulse signal is increased N times and the frequency of the PWM signal is increased N times. In this case, the motor current of each phase of the brushless motor is turned on and off at intervals shorter than the control of the PWM signal, and the accurate control is performed according to the duty ratio of the pulse width of the output signal for PWM control.

Accordingly, the desired torque can be generated by rotating the brushless motor at the desired speed. In this case, it is not necessary that the frequency of the reference pulse signal for the PWM speed control is increased by itself, so that the PWM speed control performance can be improved while avoiding the upsizing and cost increase of the apparatus.

In the motor drive control of the invention, it is also possible that a pulse having a correction pulse width shorter than the divided pulse width is generated in synchronization with a pulse front edge of each divided pulse width of the output signal, the divided pulse width is narrowed by a process of gating the output signal with the pulse having the correction pulse width, and the output signal is processed in a pulse width shorter than the divided pulse width by the correction pulse width through the regulation to correct the electric power supply of the brushless motor.

Accordingly, each divided pulse width of the output signal is processed in the pulse width shorter than the divided pulse width by the correction pulse width by the regulation of the simple gating process with the pulse having the correction pulse width, which allows the electric power supply to the coil to be freely corrected by the amount corresponding to the correction pulse width from the electric power supply based on each divided pulse width. Therefore, the coil current of each phase of the brushless motor can be controlled more finely with the simple configuration when compared with the control of the output signal, the PWM speed control performance is improved while avoiding the upsizing and cost increase of the apparatus, and the rotating speed of the brushless motor can be controlled more finely.

BRIEF DESCRIPTION OF THE DRAWINGS

Referring now to the attached drawings which form apart of this original disclosure.

DESCRIPTION OF THE PREFERRED EMBODIMENT

Figure 1:
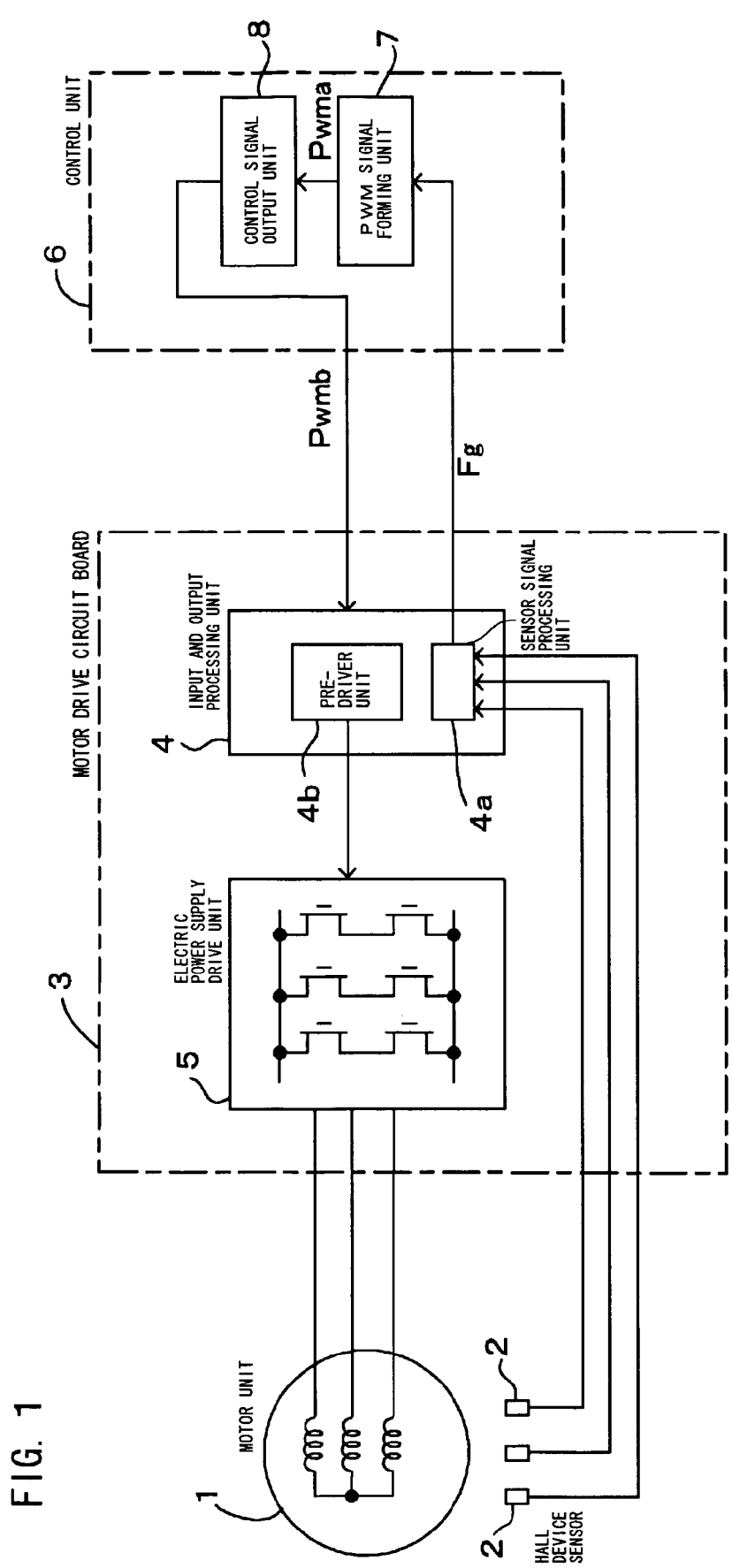
FIG. 1 is a block diagram showing a brushless motor according to a first embodiment of the invention.
Figure 2:
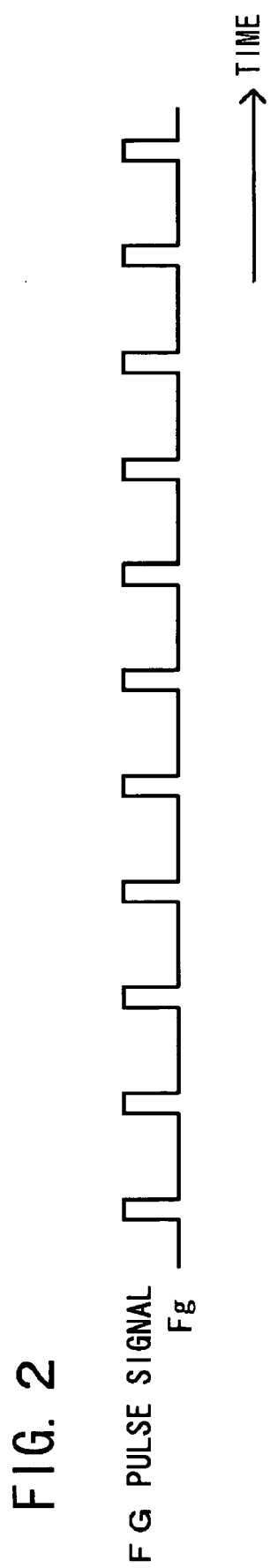
FIG. 2 is a waveform chart showing a speed-detection frequency pulse signal Fg of the brushless motor of FIG. 1.
Figure 3:
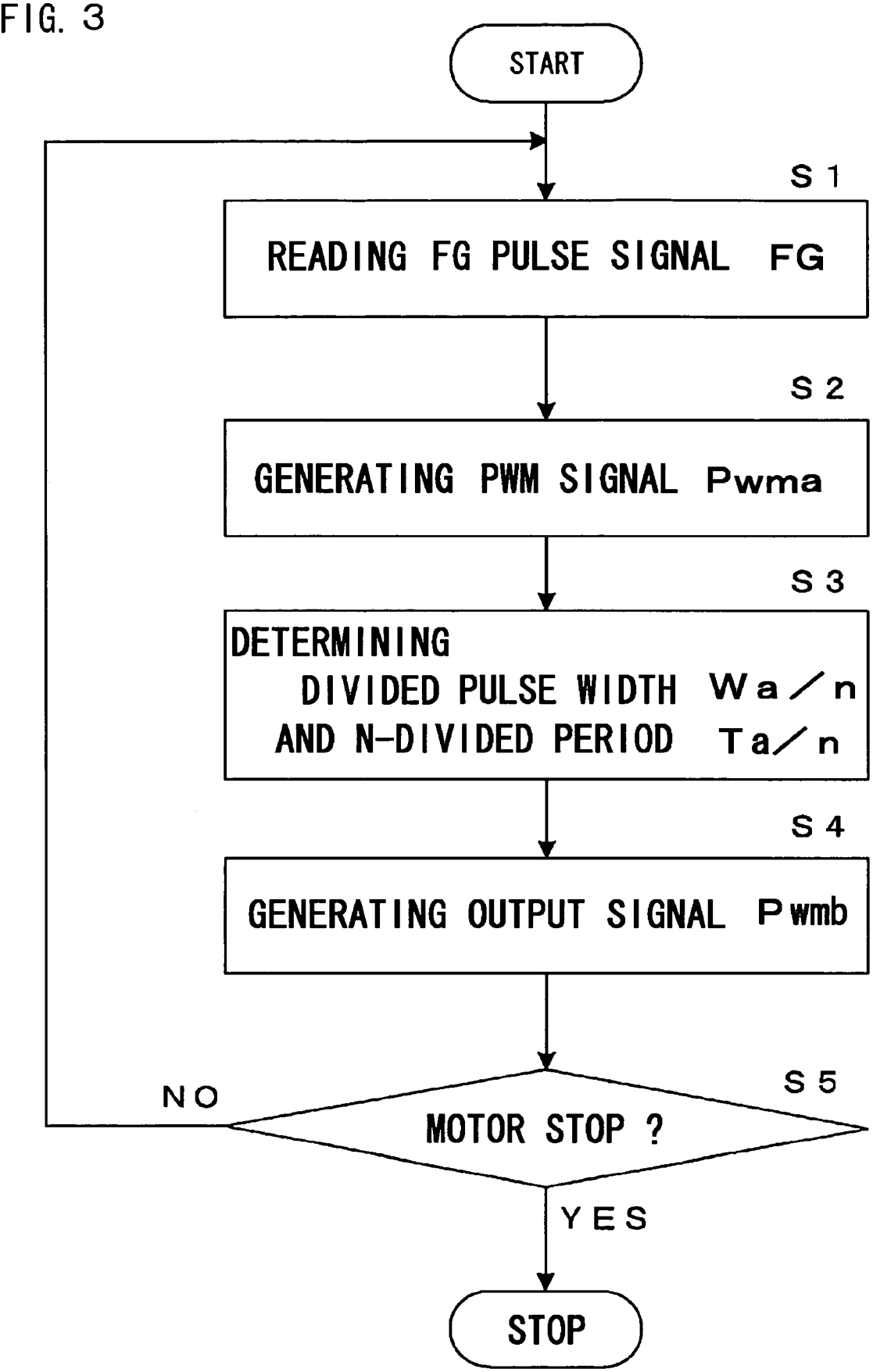
FIG. 3 is a flowchart showing speed control of the brushless motor of FIG. 1.
Figure 4:
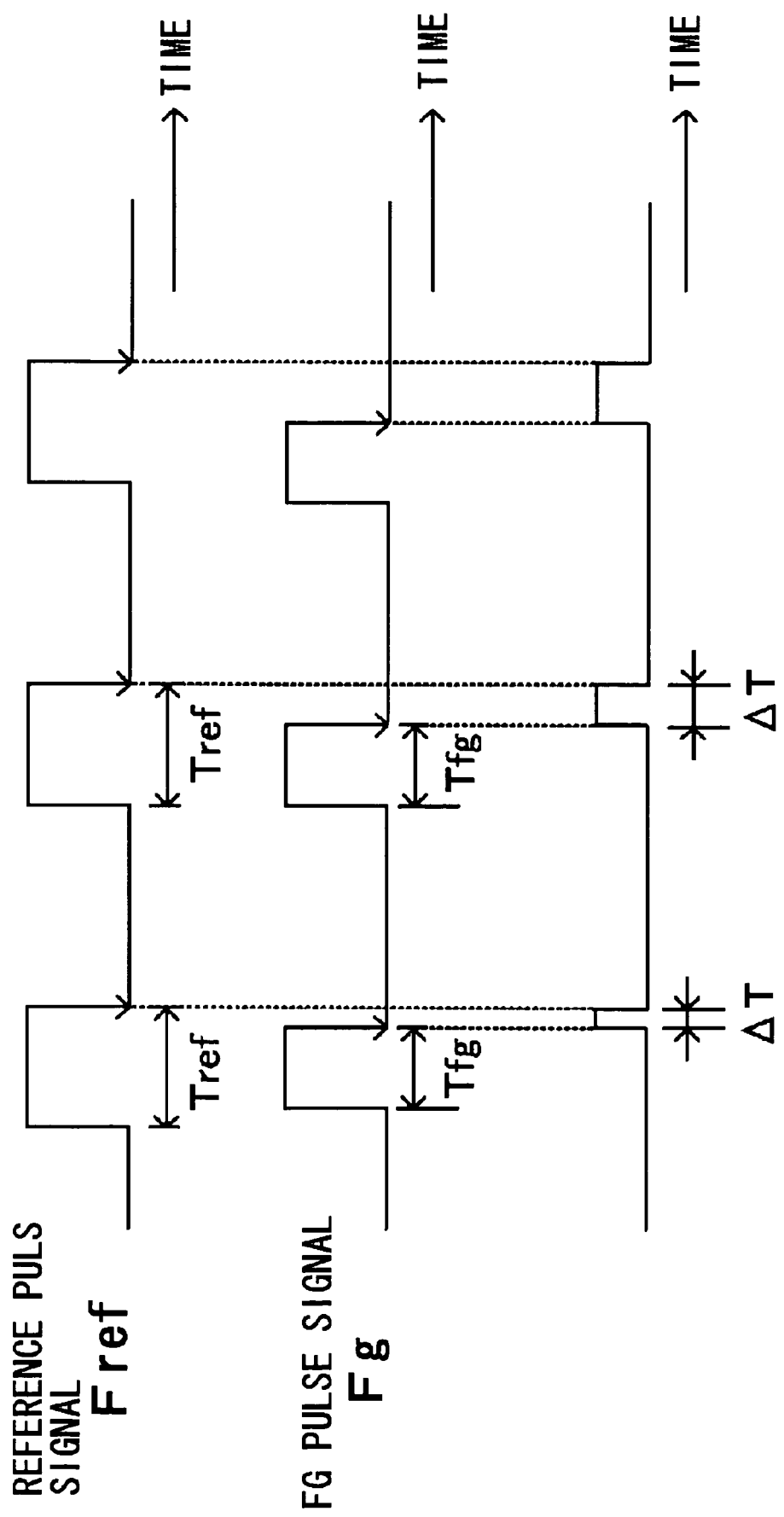
FIG. 4 is a waveform chart for explaining an operation of a PWM signal forming stage of the brushless motor shown in FIG. 1.
Figure 5:
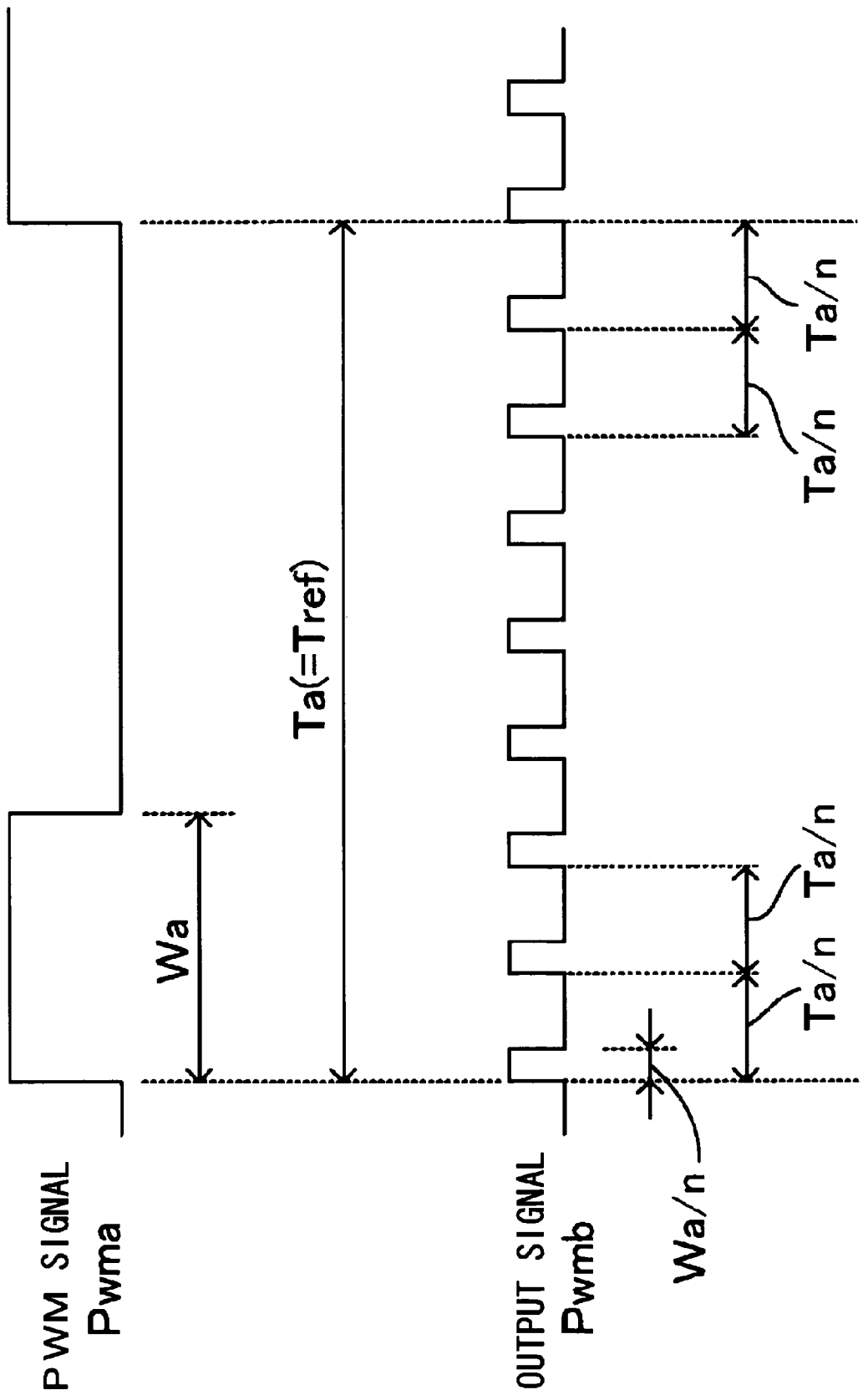
FIG. 5 is a waveform chart for explaining an operation of a control signal output stage of the brushless motor shown in FIG. 1.

A first embodiment of the invention will be described in detail with reference to FIGS. 1 to 5. FIG. 1 is a block diagram showing a motor drive control apparatus which performs the PWM speed control of the brushless motor. FIG. 2 is a waveform chart showing a speed-detection frequency pulse signal of the brushless motor. FIG. 3 is a flowchart showing the speed control of the motor drive control apparatus of FIG. 1. FIGS. 4 and 5 are waveform charts respectively for explaining the operation of each unit in the motor drive control apparatus of FIG. 1.

The brushless motor of FIG. 1 includes a motor unit 1, and the motor unit 1 includes a stator in which the coil is wound and a rotor having a circular rotor magnet. The brushless motor is the typical three-phase brushless motor used for various kinds of office automation equipment such as the sheet-feed motor of the printer, and the brushless motor is rotated at about 5000 rpm by the PWM speed control.

In order to detect the rotating speed of the rotor of the motor unit 1, plural Hall device sensors 2 (three sensors in FIG. 1) for detecting a position are provided, e.g., near the rotor of the motor unit 1. Different magnetic poles are alternately arranged in a circumferential direction of the circular rotor magnet attached to the rotor. The Hall device sensors 2 detect a change in magnetic flux associated with magnetic pole movement of the rotor magnet based on the rotation of the rotor, and the Hall device sensors 2 generate an alternating-current detection signal in which the frequency is changed in proportion to the rotating speed. A resolver or an encoder may be provided instead of the Hall device sensor 2. In this case, the similar detection signal can also be obtained.

The detection signals of the Hall device sensors 2 are taken into a sensor signal processing unit 4a of an input and output processing unit 4 in a motor drive circuit board 3 provided in the brushless motor, and the sensor signal processing unit 4a performs waveform shaping and the like. For example, as shown in FIG. 2, the speed-detection frequency pulse signal, i.e., an FG pulse signal Fg is generated by the waveform shaping. The speed detection means is formed by the Hall device sensors 2 and the sensor signal processing unit 4a. For example, the FG pulse signal Fg is generated by the 18 pulses per one rotation of the rotor of the motor unit 1, and the frequency and the pulse width are changed according to the rotating speed of the rotor.

Then, the FG pulse signal Fg is taken into a control unit 6 formed by a microcomputer including the digital signal processor (DSP). The control unit 6 is operated based on a predetermined PWM speed control program of FIG. 3, and the control unit 6 includes the following means.

(a) PWM Signal Generating Means Formed by PWM Signal Forming Unit 7

The PWM signal generating means is the same as that conventionally used, and the PWM signal generating means forms a three-phase PWM signal Pwma at the frequency of a reference pulse signal Fref. In the three-phase PWM signal Pwma, the pulse width is changed according to the frequency difference (phase difference) between the FG pulse signal Fg and the reference pulse signal Fref of the target speed.

When the FG pulse signal Fg is taken into a PWM signal generating unit 7 in Step S1 of FIG. 3, the process of Step S2 is performed. In Step S2, the reference pulse signal Fref which is set according to the target speed is generated at the frequency of the FG pulse signal Fg by dividing the frequency of a basic clock from, e.g., an oscillator in the apparatus. The pulse width of the reference pulse signal Fref is set to a reference pulse width Tref, and the pulse width of each period of the FG pulse signal Fg is set to a detection pulse width Tfg. For example, as shown in FIG. 4, a falling edge difference (phase difference) $\Delta T$ between rear edges of the detection pulse width Tfg and the reference pulse width Tref is repeatedly detected as the frequency difference between the FG pulse signal Fg and the reference pulse signal Fref.

A rewritable temporary storage register or counter is prepared in each phase in the PWM signal generating unit 7. In the register or counter, write and read are performed in synchronization with, e.g., the reference pulse signal Fref. In the temporary storage register or counter, serial data (for example, "1" in on-pulse interval and "0" in off-pulse interval) of a bit string having one period of the reference pulse signal Fref whose duty ratio is 50% is initially set as data having one period of the PWM signal Pwma. After the brushless motor is started up, the pulse width of the storage data in the temporary storage register or counter is updated by changing the polarity of the detected phase difference $\Delta T$.

Then, the storage data in the temporary storage register or counter is read in synchronization with the reference pulse signal Fref, and the PWM signal Pwma is generated in each phase as shown in FIG. 5. At this point, in consideration of load of processing of the control unit 6 and the like, a variable unit amount (gain adjustment amount) of the increase or decrease in storage data is set at a proper value of one-period length/power of 2, e.g., 1/256 period length or 1/1024 period length.

The PWM signal Pwma generated by the PWM signal generating unit 7 is the one-pulse signal in each one period Tref of the reference pulse signal Fref. When the coil current of each phase of the brushless motor is turned on and off by the PWM signal Pwma, the coil current of each phase tends to be increased at the integral characteristic, and the coil current of each phase tends to be decreased at the differential characteristic. Accordingly, sometimes the desired electric power supply set by a pulse width Wa of the PWM signal Pwma is not performed depending on the frequency, and the stable speed control is not performed with high accuracy in the brushless motor.

Therefore, in the first embodiment, the control unit 6 includes the following control signal output means.

(b) Control Signal Output Means Formed by Control Signal Output Unit 8

Figure 6:
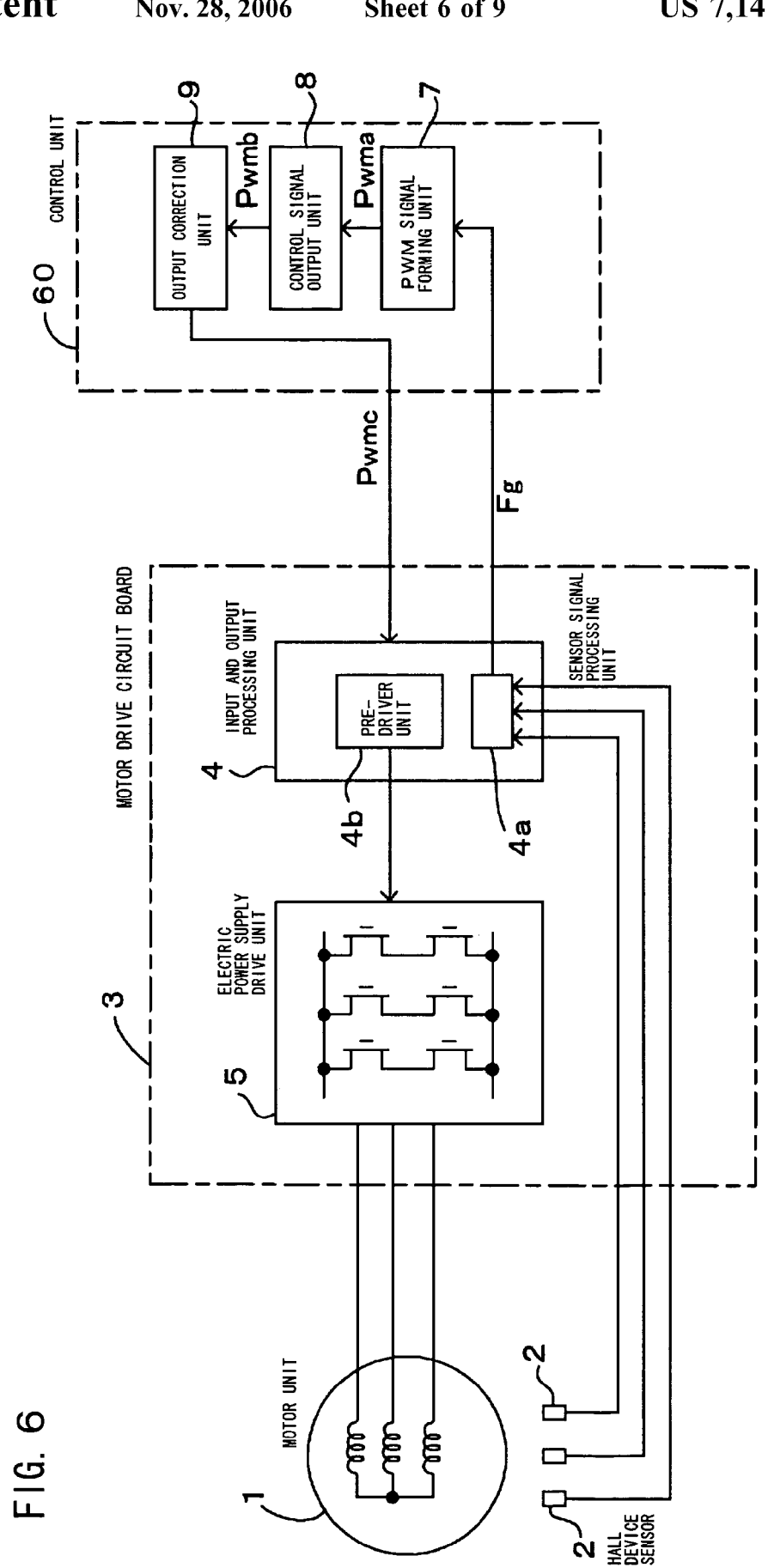
FIG. 6 is a block diagram showing a brushless motor according to a second embodiment of the invention.

The control signal output means determines the divided pulse width Wa/n in which the pulse width Wa of each one period of the PWM signal Pwma is divided by N (N is a setting value which is preferably an integer more than 1). As shown in FIG. 6, the control signal output means also forms an output signal Pwmb for the PWM control (of the N-fold frequency of the PWM signal Pwma). In the output signal Pwmb, the pulse having the divided pulse width Wa/n is arranged in each N-divided period Ta/n in which each one period Ta of the PWM control signal Pwma is divided by N. The output signal Pwmb of each phase is supplied to an electric power supply drive unit 5 of the brushless motor through a pre-driver unit 4b of the input and output processing unit 4 in the motor drive circuit board 3.

Then, the process of Step S3 is performed. For example, when N is set at 8, at each time when the temporary storage register or counter is updated by the latest one-period data, the pulse width Wa is detected from a data length (bit length) of "1", and one period Ta the PWM control signal Pwma is detected from a one-period whole data length (bit length) of the temporary storage register or counter. The divided pulse width Wa/n and the N-divided (eight-divided) period Ta/n are determined from the computation of 1/8 (=1/N) respectively.

Further, the N-divided period Ta/n is set to the one-period data length, and one-period serial data of the output signal Pwmb is generated while a bit of a front end of the divided pulse width Wa/n is set at "1". The one-period serial data of the output signal Pwmb is rewritably held in a temporary storage register or counter which is separately prepared. Then, the process of Step S4 is performed. The one-period serial data of the separately prepared temporary storage register or counter is read eight (=N) times to form the output signal Pwmb for the PWM control having eight-fold (N-fold) frequency of the PWM signal Pwma in synchronization with the reference pulse signal Fref.

In this case, the speed of the write and read of the separately prepared temporary storage register or counter in synchronization with the reference pulse signal Fref is not particularly enhanced, so that the output signal Pwmb for the PWM control can be generated by the simple program change without performing such the vast change that the frequency (period) of the reference pulse signal Fref is increased, when compared with the case in which the control is performed with the PWM signal Pwma. Therefore, the change in clock frequency or register configuration, significant update of a processing program, or the like is not required in the apparatus. Further, the upgrading of DSP or the motor control IC is not required, so that the apparatus does not become expensive nor is upsized the apparatus.

The electric power supply drive unit 5 includes a three-phase full-bridge inverter circuit having, e.g., an FET switching device. Each switching device is turned on and off by the output signal Pwmb of each phase, which results in a control state equivalent to the state, in which the frequency of the reference pulse signal Fref is increased N times and the frequency of the PWM signal Pwma is increased N times. The control state enables the coil current of each phase of the brushless motor to be turned on and off according to the duty ratio of the output signal Pwmb of each phase. In this case, the coil current of each phase is controlled by turning on and off the coil current at intervals as short as 1/N of the PWM signal Pwma, i.e., the coil current of each phase is controlled by turning on and off the coil current under the PWM control of the N-fold frequency of the conventional frequency, so that the coil current of each phase is accurately controlled according to the duty ratio of the pulse width Wa/n of the output signal Pwmb for the PWM control, and the speed control of the brushless motor is performed more accurately and stably when compared with the conventional control based on the PWM signal Pwma.

In driving the brushless motor, the flow returns to Step S1 from Step S4 through Step S5, and the process is repeated from Step S1.

Thus, in the first embodiment, the output signal Pwmb for the PWM control is formed with the simple program change by providing the control signal output means (control signal output unit 7) while the upgrading of DSP or the motor control IC is not performed, and the speed control of the brushless motor can be performed in the control state equivalent to the state, in which the frequency of the reference pulse signal Fref is increased N times and the frequency of the PWM signal Pwma is increased N times. Accordingly, the brushless motor can be controlled at the setting speed more accurately and stably when compared with the conventional control based on the PWM signal Pwma, while the apparatus does not become expensive nor is upsized the apparatus.

Then, a second embodiment of the invention will be described in detail with reference to FIGS. 6 to 9.

Figure 7:
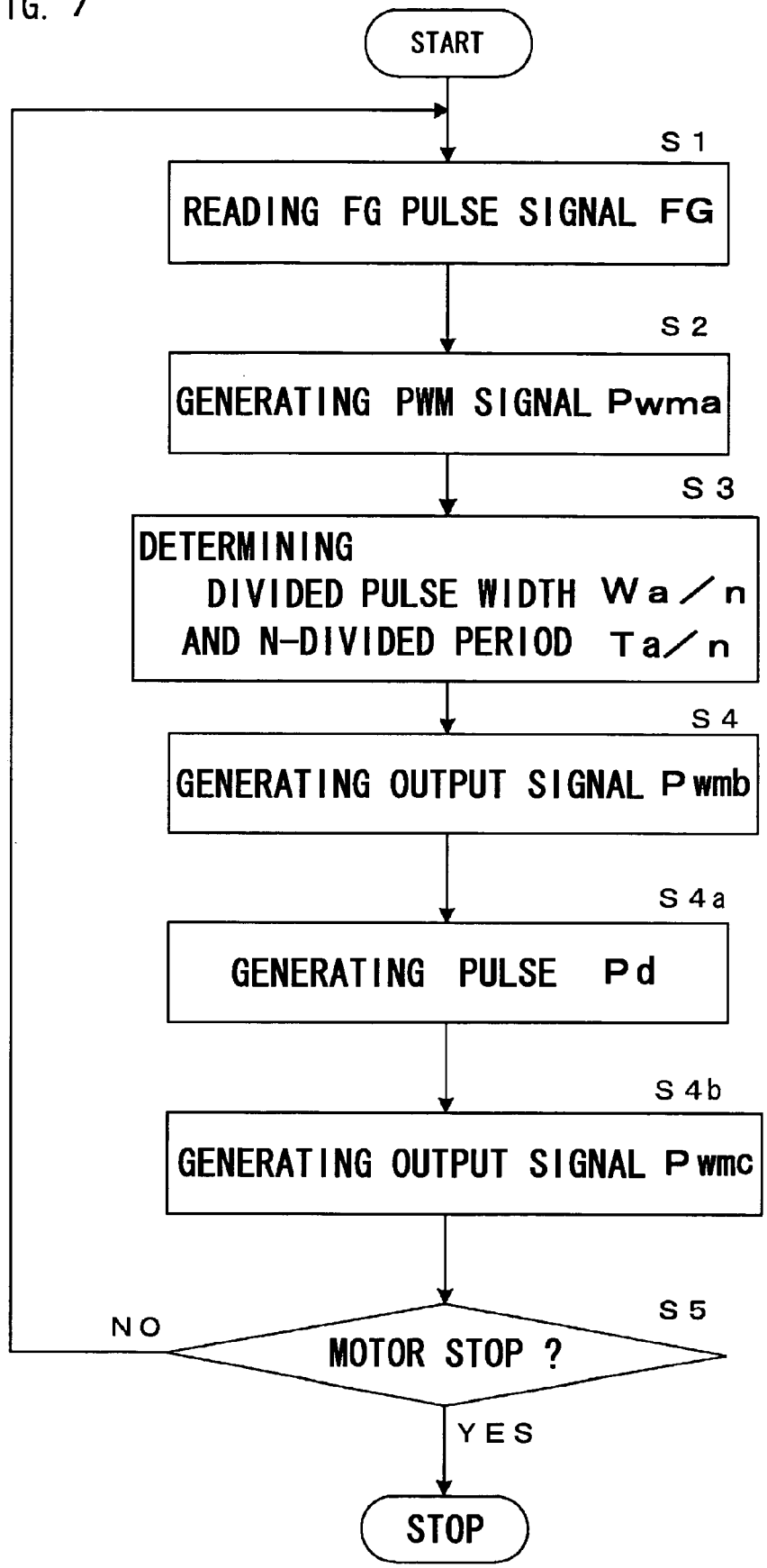
FIG. 7 is a flowchart showing the speed control of the brushless motor of FIG. 6.
Figure 8:
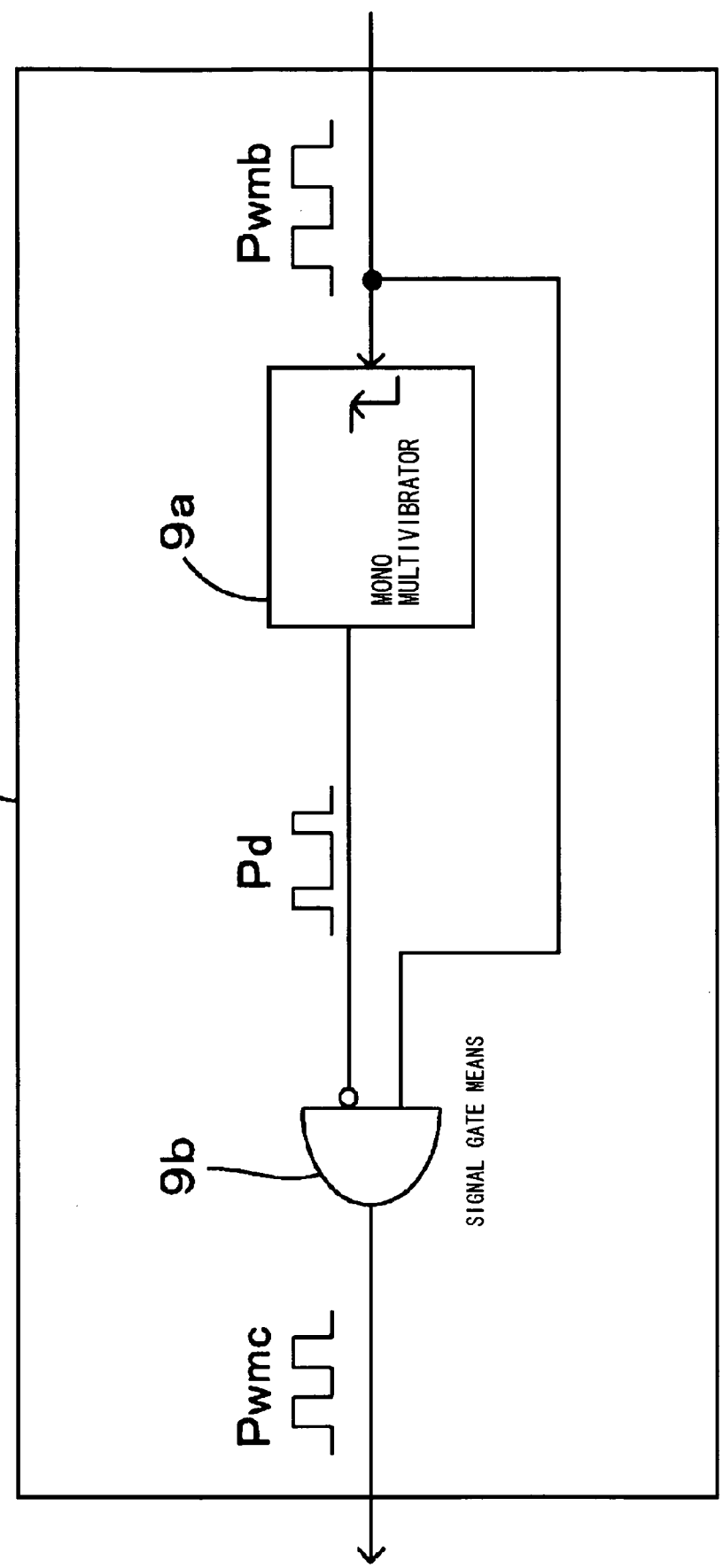
FIG. 8 is a detailed block diagram showing an output correction unit of the brushless motor of FIG. 6.
Figure 9:
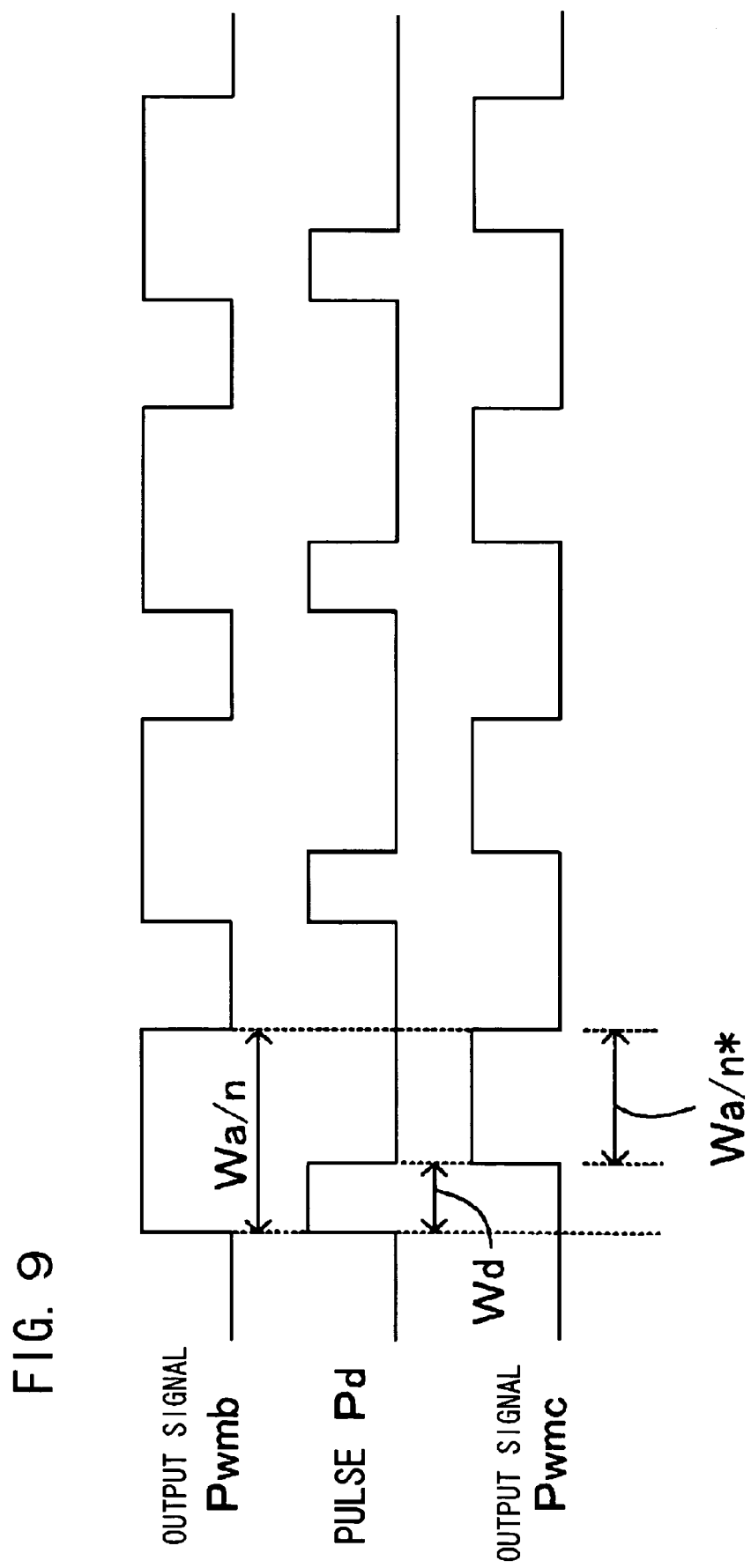
FIG. 9 is a waveform chart for explaining the operation of an output correction stage of the brushless motor shown in FIG. 6.

FIG. 6 is a block diagram showing a motor drive control apparatus which performs the PWM speed control of the brushless motor. FIG. 7 is a flowchart showing the speed control of the brushless motor of FIG. 6. FIG. 8 is a detailed block diagram showing output correction means. FIG. 9 is a waveform chart for explaining the operation of the output correction means of FIG. 8.

In the second embodiment, the control unit 6 of the first embodiment of FIG. 1 is further improved. In FIGS. 6 and 7, the component designated by the same numeral as FIGS. 1 and 3 shall be the same or corresponding component, and the detailed description will not be made.

When the setting speed of the brushless motor is decreased compared with the brushless motor of the first embodiment, the speed control is set by the gain adjustment amount. For example, it is desired that the setting and the control are performed with resolution having unit finer than the 1/256 period length or the 1/1024 period length.

Therefore, in the second embodiment, a control unit 60 of the brushless motor includes output correction means formed by an output correction unit 9 which is configured by, e.g., software, in addition to the PWM control signal generating means and the control signal output means. For example, the output correction means is formed by providing a mono-stable multivibrator (hereinafter referred to as mono multivibrator) 9a and signal gate means 9b as shown in FIG. 8.

(c) Mono Multivibrator 9a

For example, the mono multivibrator 9a is started up in each pulse front edge of the divided pulse width Wa/n of the output signal Pwmb for the PWM control based on the process of Step S5 of FIG. 7, and the mono multivibrator 9a forms a pulse Pd having a correction pulse width Wd set as shown in FIG. 9.

(d) Signal Gate Means 9b

The signal gate means 9b perform gating of the output signal Pwmb for the PWM control to reduce the divided pulse width Wa/n by the correction pulse width Wd based on the process of Step S6. As shown in FIG. 9, the output signal Pwmb is processed in an output signal Pwmc by the regulation. The output signal Pwmc has a pulse width Wa/n* shorter than the divided pulse width Wa/n by the correction pulse width Wd. Then, the electric power supply of the brushless motor is corrected by the output signal Pwmc.

In this case, the correction pulse width Wd is freely set to form the output signal Pwmc of each phase having the desired pulse width Wa/n* by setting and adjusting a time constant of the mono multivibrator 9a. As a result, when the coil current of each phase is turned on and off with the duty ratio of the desired pulse width Wa/n* in each one period of the output signal Pwmc, the speed of the brushless motor can be controlled, e.g., in unit of a $1/500$ period length between the $1/256$ period length and the $1/1024$ period length. The speed control with the $1/500$ period length cannot be performed based on the output signal Pwmb having the divided pulse width Wa/n. Therefore, the resolution of the speed control of the brushless motor can further be increased to realize the speed setting and control in finer unit.

In addition, the speed setting and control can be realized with high accuracy by adding the extremely simple configuration of the output correction means including the mono multivibrator 9a and the signal gate means 9b. In this case, the significant update of the processing program and the like are not required, and the upgrading of DSP or the motor control IC is not required. Therefore, it is obvious that the apparatus does not become expensive nor is upsized the apparatus.

Since the PWM speed control resolution of the brushless motor is improved, when the speed of the brushless motor is decreased compared with the conventional brushless motor, the brushless motor 1 can be controlled at the desired speed with higher accuracy compared with the control of the output signal Pwmb having the divided pulse width Wa/n. For various experiments, for example, even if the speed of the brushless motor 1 which is set at about 5000 rpm in the output signal Pwma having the pulse width Wa is decreased to about 3400 rpm, it is confirmed that the PWM speed control can stably be performed with high accuracy by using the output signal Pwmc having the pulse width Wa/n*.

In driving the brushless motor, the flow returns to Step S1 of FIG. 7 from Step S6 through Step S7, and the process is repeated from Step S1.

Thus, in the second embodiment, similarly to the first embodiment, the output signal Pwmb for the PWM control is generated with the simple program change while the upgrading of DSP or the motor control IC is not performed, and the speed control of the brushless motor can be performed in the control state equivalent to the state, in which the frequency of the reference pulse signal Fref is increased N times and the frequency of the PWM signal Pwma is increased N times. As a result, the brushless motor can be controlled at the setting speed more accurately and stably when compared with the conventional control based on the PWM signal Pwma, while the apparatus does not become expensive nor is upsized the apparatus.

In addition, in the second embodiment, the output signal Pwmb from the control signal output means can simply be corrected in the output signal Pwmc having the pulse width Wa/n* for the desired speed to increase the speed control resolution by providing the output correction means in the control unit 60. For example, when the speed of the brushless motor is decreased compared with the conventional brushless motor, the PWM control of the brushless motor can accurately and stably be performed at the desired speed by the finer setting.

Therefore, when the brushless motor is used as the motor of various kinds of office automation equipment such as the sheet-feed motor of the printer, the speed control can accurately and stably be performed while the apparatus is not upsized nor is generated the cost increase.

The invention is not limited to the above embodiments, but various modifications could be made without departing from the scope of the invention. For example, depending on the usage of the brushless motor, the mono multivibrator 9a and the signal gate means 9b which constitute the output correction means may obviously be formed by a hardware circuit.

It is obvious that the invention can be applied to the speed control of the brushless motors in a variety of uses.

What is claimed is:

1. A control method for a brushless motor in which a brushless motor including plural coils is driven by a PWM speed control method, the motor control method comprising:

a first step of calculating a pulse width of a PWM signal for a cycle based on a frequency of a reference pulse signal predetermined by a target speed of the motor, the pulse width of the PWM signal being calculated based on a frequency difference between a signal of a rotating speed detector and the reference pulse signal;

a second step, of dividing the pulse width of said PWM signal by predetermined number N to calculate a divided pulse width;

a third step, of generating the divided pulse width in which said divided pulse width is generated in a N-divided period of the cycle of said PWM signal; and a fourth step, of switching an electric power supply unit by said divided pulse width, to drive said coils.

2. A motor control method according to claim 1, wherein:

a correction pulse signal is generated, the front edge of the correction pulse being in synchronization with a front edge of each pulse of said output signal; and said output signal for PWM control is subjected to a gating process before it is used for said fourth step, the gating process in which the signal is forced to be zero while said correction pulse is present.

3. A control apparatus for a brushless motor having an electric power supply unit, comprising:

speed detection means for generating a pulse signal, the frequency of which is varied according to a rotating speed of said brushless motor;

PWM signal generating means for generating a PWM signal, each pulse width of which is varied according to a frequency difference between said pulse signal of said speed detection means and a reference pulse signal; and control signal output means for generating an output signal for PWM control, the width of a pulse of the output signal being determined by dividing a width of a pulse of said PWM signal by predetermined number N, pulses in the output signal being arranged with intervals of a N-divided period of a cycle of said PWM signal, the control signal output means supplying the output signal to said electric power supply unit of said brushless motor.

4. A control apparatus for a brushless motor having an electric power supply unit as set forth in claim 3, further comprising:

a mono-stable multi-vibrator which is triggered to generate a correction pulse at a front edge of each pulse of said output signal, the width of the correction pulse being predetermined width which is narrower than that of a pulse of said output signal; and a gate to force said output signal to zero while said correction pulse is present to reduce the width of each pulse of said output signal.

* * * * *